No. 667,246. Patented Feb. 5, 1901.
F. C. NEWELL.
ELECTROMAGNETIC BRAKE SHOE.
(Application filed Apr. 28, 1900.)
(No Model.)
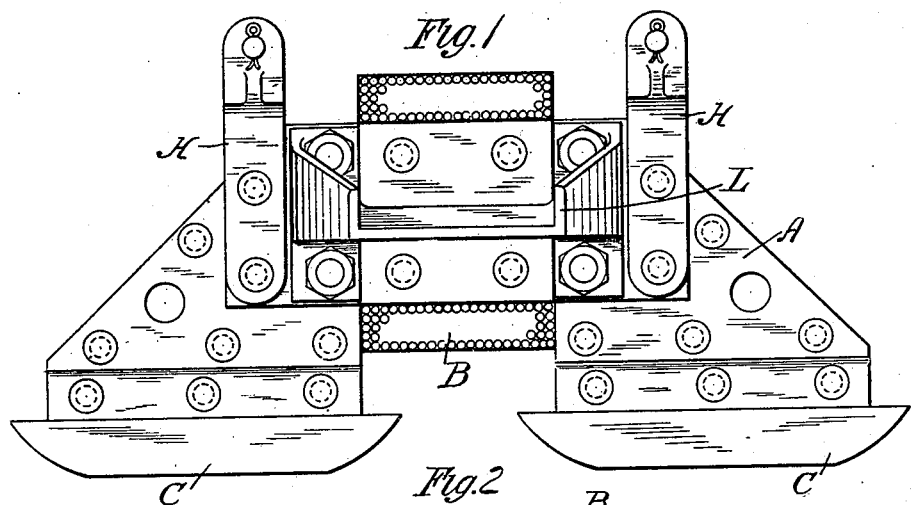
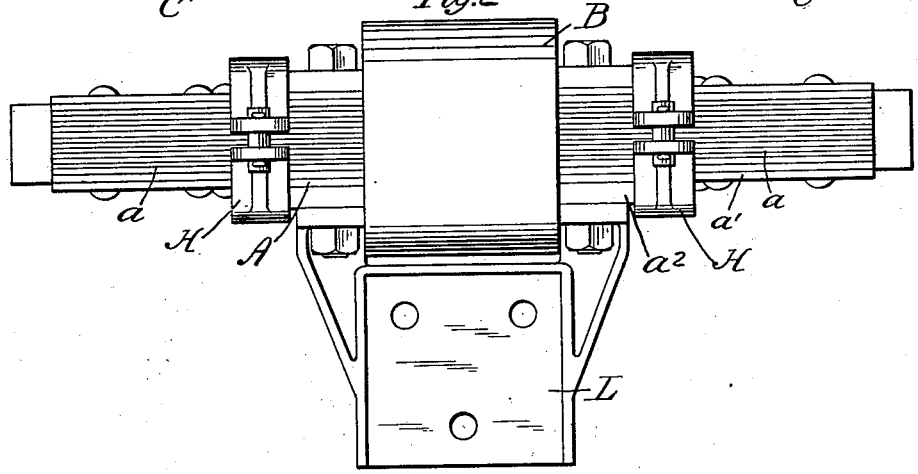
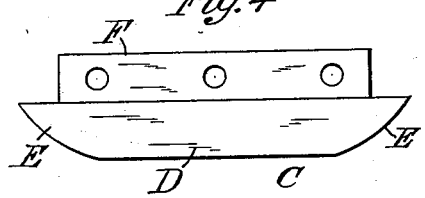
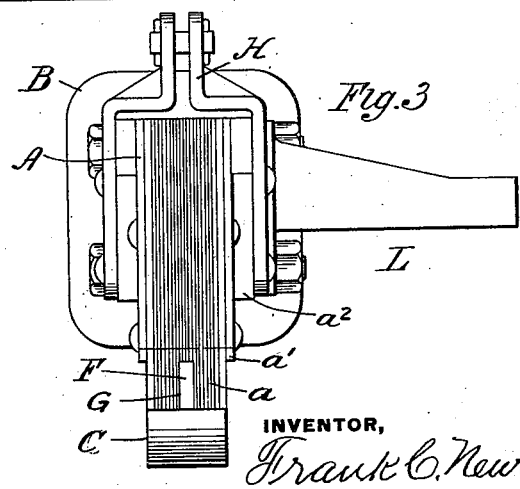
WITNESSES:
INVENTOR,
Frank C. Newell,
by T. J. Hogan, Att'y.
THE NORRIS PETERS CO., PHOTO-LITHO., WASHINGTON, D. C.

UNITED STATES PATENT OFFICE.

FRANK C. NEWELL, OF WILKINSBURG, PENNSYLVANIA, ASSIGNOR TO THE WESTINGHOUSE AIR BRAKE COMPANY, OF PITTSBURG, PENNSYLVANIA.

ELECTROMAGNETIC BRAKE-SHOE.

SPECIFICATION forming part of Letters Patent No. 667,246, dated February 5, 1901.

Application filed April 28, 1900. Serial No. 14,686. (No model.)

*To all whom it may concern:*

Be it known that I, FRANK C. NEWELL, a citizen of the United States, residing at Wilkinsburg, county of Allegheny, State of Pennsylvania, have invented or discovered a certain new and useful Improvement in Electromagnetic Brake-Shoes, of which improvement the following is a specification.

My invention relates to an electromagnetic brake-shoe for cars; and its object is to provide a magnetic brake-shoe which may be easily and cheaply constructed, at the same time being strong and durable and of increased magnetic efficiency.

My invention consists in constructing the magnetic brake-shoe body of a series of plates or laminations securely fastened together in a solid bunch or pack, to which the wear shoe or shoes are secured.

My invention also consists in the means for securing the wear-shoe to the body, as more fully hereinafter described and claimed.

In the accompanying drawings, forming a part of this specification, Figure 1 shows a side elevation of an electromagnetic brake-shoe constructed according to my invention, the coil of wire being indicated in section. Fig. 2 is a plan view. Fig. 3 is an end elevation, and Fig. 4 is a detail view showing one of the wearing-shoes.

As shown in the drawings, my device is applied as a track-brake; but I do not limit myself to this use of the invention, as it may be equally-well adapted to be applied to a wheel-shoe or other brake device.

The main body or core A of my electromagnetic brake device is made up of a series of plates or laminations $a$, which may be of varying thicknesses, and these laminations are firmly secured together in any desired manner, such as by bolts or rivets. The plates $a$ may be made by being stamped out of sheet metal, such as soft iron, or they may be formed in other ways, as by casting.

B represents a coil of wire wound about the body A and forming thereof an electromagnet.

As shown in the drawings, the plates are made in substantially arch-shaped form, with the two ends or poles extending downward. It is not essential, however, that the plates should be arch-shaped, as they may be made in other forms.

C represents the wear-shoes, which are secured at each end of the body or bunch of plates, and each one is composed of a solid wearing portion D, having rounded ends E and a projecting flange or rib F. The ends of the body A are provided with slots G, adapted to receive the ribs F of the shoes D and in which they are secured, preferably, by rivets, as shown.

When used as a rail-shoe, a sufficient number of plates or laminations are used to produce a body of a thickness at its ends substantially equal to the width of the rail, and the wear-shoes may be made of a corresponding width.

The wear-shoes being narrow to correspond with the width of the rail or other bearing-surface, they are made of sufficient length to secure the required amount of magnetic traction force. The width of the body at its end where the shoe is attached corresponds with the length of the shoe, while at other portions, where the magnetic coil is wound, it is made narrower, so that the lower side of the coil will be of sufficient height above the rail to clear all obstructions. Thus the vertical width of the plates of the brake-shoe body at its upper central portion, where the coil is wound, is less than their width at the ends of the body where the wear-shoes are attached, and in order that the cross-sectional area for the magnetic force may be substantially uniform throughout the length of the body it must be made thicker at its narrower portions.

Additional plates of suitable lengths, such as $a'$ $a^2$, are secured to the side of the body at its narrow portions in order to secure a substantially uniform area of cross-section throughout the length of the body. By this means the cross-sectional area of the magnetic field is made substantially the same for the entire length of the body of the brake-shoe device.

On one side of the body is secured a casting of bronze or some non-magnetic material, forming a bracket L, to which an arm may be secured for connecting the device with a similar one on the other side of the car. The body is also provided with hangers H, by which it may be suspended from the frame of the car-truck.

I have found that the body composed of a series of plates or laminations has many advantages over a body made of one solid piece of metal. The cost of construction is much cheaper in the first instance. The magnetic efficiency of the device is much greater, while at the same time it is stronger, more durable, and more easily constructed.

I claim as my invention—

1. A magnetic brake-shoe device having a body, or core, made up of a series of plates, or laminations, securely fastened together and provided with wear-shoes at its ends, or poles.

2. A magnetic brake-shoe having a body or core made up of a series of plates or laminations securely fastened together.

3. In a brake-shoe device, a body composed of a series of plates or laminations, and a wear-shoe provided with a projecting rib adapted to be secured to the body.

4. A magnetic brake-shoe device consisting of a brake-shoe body made up of a series of plates, or laminations, securely fastened together, a coil surrounding the body, and wear-shoes secured to the ends, or poles, thereof.

5. In a magnetic brake-shoe, a body composed of a series of plates, or laminations, securely fastened together and having projecting poles, or ends, a coil surrounding the body, slots arranged in the poles or ends, and wear-shoes having projecting ribs adapted to be secured in said slots.

6. A magnetic brake-shoe device having a body, or core, composed of a series of plates, or laminations, securely fastened together, a wear-shoe secured at the end of the body, said body being wider at its end where the shoe is attached than at other portions, and additional plates secured to the side of the body at such narrower portions, whereby a uniform area of cross-section is obtained throughout the length of the body.

In testimony whereof I have hereunto set my hand.

FRANK C. NEWELL.

Witnesses:
R. F. EMERY,
JAS. B. MACDONALD.